US008635677B2

(12) United States Patent
Shigehisa et al.

(10) Patent No.: US 8,635,677 B2
(45) Date of Patent: Jan. 21, 2014

(54) INFORMATION PROCESSING APPARATUS, SCREEN TRANSMITTING METHOD, AND NON-TRANSITORY COMPUTER-READABLE RECORDING MEDIUM ENCODED WITH SCREEN TRANSMITTING PROGRAM

(75) Inventors: Kei Shigehisa, Nishinomiya (JP);
Takeshi Morikawa, Takarazuka (JP);
Kenji Matsuhara, Kawanishi (JP);
Toshimichi Iwai, Kitakatsuragi-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 90 days.

(21) Appl. No.: 13/225,910

(22) Filed: Sep. 6, 2011

(65) Prior Publication Data

US 2012/0066743 A1 Mar. 15, 2012

(30) Foreign Application Priority Data

Sep. 13, 2010 (JP) ................. 2010-204682

(51) Int. Cl.
*H04L 9/32* (2006.01)
*H04L 29/06* (2006.01)
(52) U.S. Cl.
USPC ......... 726/5; 726/4; 726/17; 726/27; 715/741
(58) Field of Classification Search
None
See application file for complete search history.

(56) References Cited

U.S. PATENT DOCUMENTS

| | | | | |
|---|---|---|---|---|
| 6,968,506 B2* | 11/2005 | Yacovone et al. | ............ | 715/730 |
| 7,360,085 B2* | 4/2008 | Loveria, III | .................. | 713/165 |
| 2004/0227900 A1* | 11/2004 | Sato et al. | ...................... | 353/30 |
| 2004/0267981 A1 | 12/2004 | Kakemura | | |
| 2005/0033805 A1 | 2/2005 | Fujiyama et al. | | |
| 2005/0039129 A1* | 2/2005 | Paul | ............................. | 715/730 |
| 2005/0039130 A1* | 2/2005 | Paul | ............................. | 715/730 |
| 2005/0039131 A1* | 2/2005 | Paul | ............................. | 715/730 |
| 2008/0168355 A1* | 7/2008 | Dunlap et al. | ................ | 715/733 |

(Continued)

FOREIGN PATENT DOCUMENTS

| | | | |
|---|---|---|---|
| JP | 10-232657 A | 9/1998 | |
| JP | 2002-369166 A | 12/2002 | |

(Continued)

OTHER PUBLICATIONS

Office Action (Notice of Ground of Rejection) dated Jul. 24, 2012, issued in corresponding Japanese Patent Application No. 2010-204682, and an English Translation thereof. (6 pages).

*Primary Examiner* — Christopher Revak
(74) *Attorney, Agent, or Firm* — Buchanan Ingersoll & Rooney PC

(57) ABSTRACT

An information processing apparatus includes a storing portion, an authentication portion to authenticate a user using one of the one or more user apparatuses on the basis of identification information received from the user apparatus; a selecting portion to select, as main data, a piece of data from among one or more pieces of data stored in a presentation area which is a predetermined one of the plurality of storage areas; a screen generating portion to generate an access screen including an image of the selected main data; an access detecting portion to detect an access to the presentation area; and a screen transmitting portion, when the access detecting portion detects an access to the presentation area by the authenticated user, to transmit the generated access screen to the one of the one or more user apparatuses that is used by the authenticated user.

17 Claims, 12 Drawing Sheets

(56) References Cited

U.S. PATENT DOCUMENTS

| | | | |
|---|---|---|---|
| 2010/0132020 A1* | 5/2010 | Paul | 726/7 |
| 2012/0127196 A1* | 5/2012 | Landry | 345/619 |
| 2012/0130834 A1* | 5/2012 | Landry | 705/26.1 |
| 2012/0130845 A1* | 5/2012 | Telek et al. | 705/26.5 |
| 2012/0131359 A1* | 5/2012 | Landry et al. | 713/310 |
| 2012/0131465 A1* | 5/2012 | Telek et al. | 715/733 |

FOREIGN PATENT DOCUMENTS

| | | |
|---|---|---|
| JP | 2003-085112 A | 3/2003 |
| JP | 2003-110555 A | 4/2003 |
| JP | 2004-240825 A | 8/2004 |
| JP | 2006-134094 A | 5/2006 |
| JP | 2006-148730 A | 6/2006 |
| JP | 2006-279535 A | 10/2006 |
| JP | 2009-188809 A | 8/2009 |

* cited by examiner

INFORMATION PROCESSING APPARATUS, SCREEN TRANSMITTING METHOD, AND NON-TRANSITORY COMPUTER-READABLE RECORDING MEDIUM ENCODED WITH SCREEN TRANSMITTING PROGRAM

This application is based on Japanese Patent Application No. 2010-204682 filed with Japan Patent Office on Sep. 13, 2010, the entire content of which is hereby incorporated by reference.

BACKGROUND OF THE INVENTION

1. Field of the Invention

The present invention relates to an information processing apparatus, a screen transmitting method, and a non-transitory computer-readable recording medium encoded with a screen transmitting program. More particularly, the present invention relates to an information processing apparatus which manages data to be accessed by a plurality of users, and to a screen transmitting method and a non-transitory computer-readable recording medium encoded with a screen transmitting program which are executed by the information processing apparatus.

2. Description of the Related Art

In a conference and the like, images of materials prepared in advance are displayed on a screen to be used for explanation during a presentation. In recent years, it is often the case that a presenter stores explanatory materials in a personal computer (PC) used by him/herself, and connects a projector or the like serving as a display device to the presenter's PC so as to cause the material images output from the presenter's PC to be displayed by the projector. It is also possible that a conference participant causes a PC used by him/herself to receive display data transmitted from the presenter's PC so as to cause the same image as that displayed by the projector to be displayed on the participant's PC.

For example, Japanese Patent Laid-Open No. 2003-085112 discloses a network information processing system in which a plurality of pieces of information transmitted from a plurality of information processing apparatuses are held in information supply managing means so as to allow smooth and orderly transmission of document information or the like from a plurality of participants related to an electronic conference system.

With the conventional network information processing system, however, an application program dedicated to communicating with the information supply managing means has to be installed in each of the plurality of information processing apparatuses. Further, it is difficult to determine which one of the plurality of pieces of information transmitted from the information processing apparatuses should be transmitted.

SUMMARY OF THE INVENTION

According to an aspect of the present invention, an information processing apparatus is capable of communicating with one or more user apparatuses, and includes: a storing portion capable of storing data in a plurality of storage areas; an authentication portion to authenticate a user using one of the one or more user apparatuses on the basis of one or more pieces of identification information received from the one of the one or more user apparatuses; a selecting portion to select, as main data, a piece of data from among one or more pieces of data stored in a presentation area, the presentation area being a predetermined one of the plurality of storage areas; a screen generating portion to generate an access screen including an image of the selected main data; an access detecting portion to detect an access to the presentation area; and a screen transmitting portion, in response to the event that the access detecting portion detects an access to the presentation area by the authenticated user, to transmit the generated access screen to the one of the one or more user apparatuses that is used by the authenticated user.

According to another aspect of the present invention, a screen transmitting method is performed by an information processing apparatus capable of communicating with one or more user apparatuses, the information processing apparatus including a storing portion capable of storing data in a plurality of storage areas, wherein the screen transmitting method includes steps of: authenticating a user using one of the one or more user apparatuses on the basis of one or more pieces of identification information received from the one of the one or more user apparatuses; selecting, as main data, a piece of data from among one or more pieces of data stored in a presentation area, the presentation area being a predetermined one of the plurality of storage areas; generating an access screen including an image of the selected main data; detecting an access to the presentation area; and in response to the event that an access to the presentation area by the authenticated user is detected in the access detecting step, transmitting the generated access screen to the one of the one or more user apparatuses that is used by the authenticated user.

According to a further aspect of the present invention, a non-transitory computer-readable recording medium is encoded with a screen transmitting program, the screen transmitting program being executed by a computer which controls an information processing apparatus capable of communicating with one or more user apparatuses, the information processing apparatus including a storing portion capable of storing data in a plurality of storage areas, wherein the screen transmitting program causes the computer to execute processing including steps of: authenticating a user using one of the one or more user apparatuses on the basis of one or more pieces of identification information received from the one of the one or more user apparatuses; selecting, as main data, a piece of data from among one or more pieces of data stored in a presentation area, the presentation area being a predetermined one of the plurality of storage areas; generating an access screen including an image of the selected main data; detecting an access to the presentation area; and in response to the event that an access to the presentation area by the authenticated user is detected in the access detecting step, transmitting the generated access screen to the one of the one or more user apparatuses that is used by the authenticated user.

The foregoing and other features, aspects, and advantages of the present invention will become more apparent from the following detailed description of the present invention when taken in conjunction with the accompanying drawings.

DESCRIPTION OF THE PREFERRED EMBODIMENTS

Figure 1:
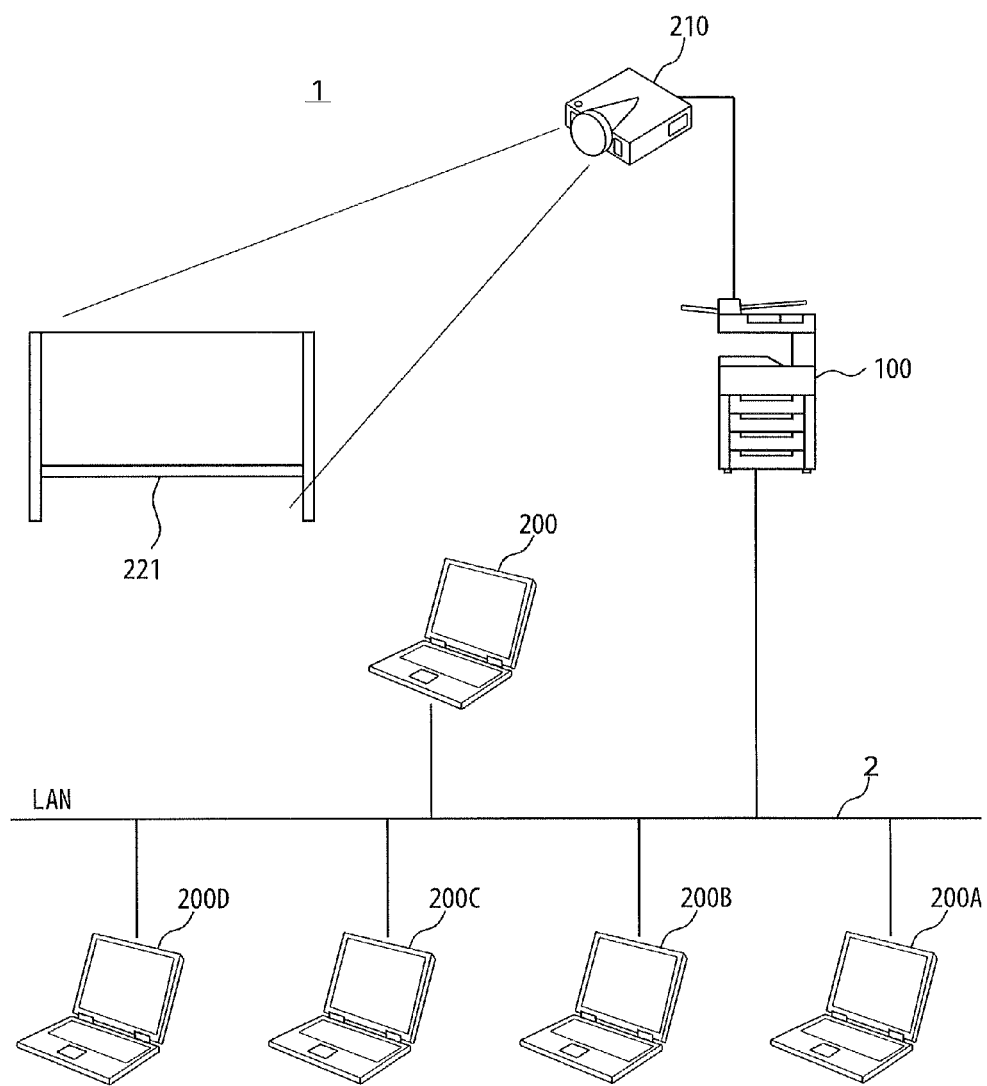
FIG. 1 shows an example of a conference system according to a first embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

First Embodiment

FIG. 1 shows an example of a conference system according to a first embodiment of the present invention. Referring to FIG. 1, a conference system 1 includes a multi-function peripheral (MFP) 100, a plurality of PCs 200 and 200A to 200D, a projector 210, and a whiteboard 221. MFP 100 and PCs 200 and 200A to 200D are each connected to a local area network (hereinafter, referred to as "LAN") 2.

MFP 100, which is an example of an information processing apparatus, includes a plurality of functions such as the scanner function, function as a printer, copying function, and facsimile transmitting/receiving function. MFP 100 is able to communicate with PCs 200 and 200A to 200D through LAN 2. MFP 100 is connected to projector 210, and controls the same to project an image. Although MFP 100 and PCs 200 and 200A to 200D are connected with each other through LAN 2 in this example, they may be connected through serial communication cables or parallel communication cables as long as they can communicate with each other. The communication may be wired or wireless. Further, although projector 210 is directly connected to MFP 100 in this example, projector 210 may be connected to LAN 2, in which case MFP 100 may control projector 210 via LAN 2.

In conference system 1 according to the present embodiment, a presenter in a conference causes MFP 100 to store content as a presentation material therein. The content may include any data that can be displayed by a computer, such as an image, a character, a chart or graph, or a combination thereof.

MFP 100 functions as a display control apparatus, which controls projector 210 to project an image constituting at least a part of the content so that the image is displayed on whiteboard 221. Specifically, MFP 100 determines at least a part of the content as a display area, and transmits the image of the display area as a display image to projector 210, to cause projector 210 to display the display image. The display image is identical in size to an image that can be displayed by the projector. Therefore, in the case where the entirety of content is greater in size than the display image, a part of the content is set as the display area. In the case where the size of the entirety of content is equal to or smaller than that of the display image, the entirety of the content is set as the display area.

It is noted that MFP 100 may transmit content to projector 210 in advance, and remotely control projector 210 to display the display image. In this case as well, at least a part of the content is set as a display area, so that the display image of the display area of the content is displayed. The format of the display image transmitted from MFP 100 to projector 210 is not limited to a particular one, as long as projector 210 can receive and interpret the same.

Projector 210 includes a liquid crystal display, a lens, and a light source, and projects a display image received from MFP 100 onto a drawing surface of whiteboard 221. Specifically, the liquid crystal display displays a display image. The light emitted from the light source transmits through the liquid crystal display and is emitted onto whiteboard 221 via the lens. When the light emitted from projector 210 reaches the drawing surface of whiteboard 221, a magnified version of the display image displayed on the liquid crystal display is thrown onto the drawing surface. Herein, the drawing surface of whiteboard 221 corresponds to a projection surface onto which projector 210 projects a display image.

PCs 200 and 200A to 200D are typical computers. Their hardware configurations and functions are well known in the art, and thus, a description thereof will not be provided here. Each of PCs 200 and 200A to 200D is able to access a hard disk drive (HDD) included in MFP 100, and displays an image of content obtained by downloading the content stored in the HDD or by downloading content during streaming, or displays a moving image which is streamed.

Figure 2:
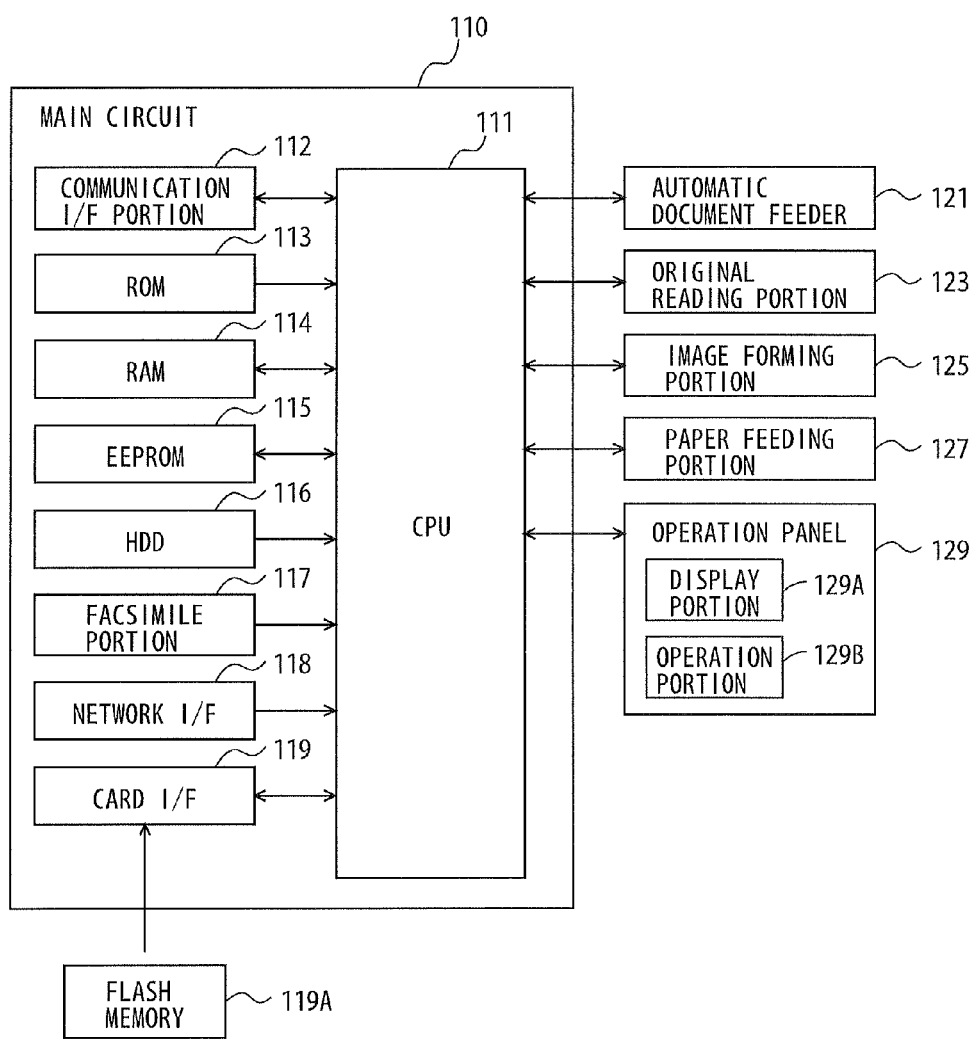
FIG. 2 is a block diagram showing an example of the hardware configuration of an MFP.

FIG. 2 is a block diagram showing an example of the hardware configuration of the MFP. Referring to FIG. 2, MFP 100 includes: a main circuit 110; an original reading portion 123 which reads an original; an automatic document feeder 121 which delivers an original to original reading portion 123; an image forming portion 125 which forms, on a sheet of paper or the like, a still image output from original reading portion 123 that read an original; a paper feeding portion 127 which supplies sheets of paper to image forming portion 125; and an operation panel 129 serving as a user interface.

Main circuit 110 includes a central processing unit (CPU) 111, a communication interface (I/F) portion 112, a read only memory (ROM) 113, a random access memory (RAM) 114, an electrically erasable and programmable ROM (EEPROM) 115, a hard disk drive (HDD) 116 as a mass storage, a facsimile portion 117, a network interface (I/F) 118, and a card interface (I/F) 119 to which a flash memory 119A is mounted. CPU 111 is connected with automatic document feeder 121, original reading portion 123, image forming portion 125, paper feeding portion 127, and operation panel 129, and is responsible for overall control of MFP 100.

ROM 113 stores a program executed by CPU 111 as well as data necessary for execution of the program. RAM 114 is used as a work area when CPU 111 executes a program.

Operation panel 129 is provided on an upper surface of MFP 100, and includes a display portion 129A and an operation portion 129B. Display portion 129A is a display such as a liquid crystal display or an organic electro-luminescence display (ELD), and displays an instruction menu for a user, information about acquired display data, and others. Operation portion 129B is provided with a plurality of keys, and accepts input of data such as instructions, characters, and numerical characters, according to the key operations of the user. Operation portion 129B further includes a touch panel provided on display portion 129A.

Communication I/F portion 112 is an interface for connecting MFP 100 to another device, which is projector 210 here. The interface may be connected through serial communication cables, parallel communication cables, or video cables. The connection may be wired or wireless.

Facsimile portion 117 is connected to public switched telephone networks (PSTN), and transmits facsimile data to or receives facsimile data from the PSTN. Facsimile portion 117 stores the received facsimile data in HDD 116, or outputs it to image forming portion 125. Image forming portion 125 prints the facsimile data received by facsimile portion 117 on a sheet of paper. Further, facsimile portion 117 converts the data stored in HDD 116 to facsimile data, and transmits it to a facsimile machine connected to the PSTN.

HDD 116 includes a plurality of storage areas for storing data in a non-volatile manner. The plurality of storage areas include a personal storage area which is allocated to a user who is allowed to use MFP 100 and which can be accessed by that user, and a public storage area which can be accessed by a plurality of users. The public storage area includes a presentation box, which will be described later.

Network I/F 118 is an interface for connecting MFP 100 to LAN 2. CPU 111 is capable of communicating with PCs 200 and 200A to 200D connected to LAN 2 via network I/F 118. When LAN 2 is connected to the Internet, CPU 111 is capable of communicating with computers connected to the Internet. The computers connected to the Internet include an e-mail server which transmits and receives e-mail. The network to which network I/F 118 is connected is not restricted to LAN 2. It may be the Internet, a wide area network (WAN), public switched telephone networks (PSTN), or the like.

Card I/F 119 is mounted with flash memory 119A. CPU 111 is capable of accessing flash memory 119A via card I/F 119. CPU 111 is capable of loading a program stored in flash memory 119A, to RAM 114 for execution. It is noted that the program executed by CPU 111 is not restricted to the program stored in flash memory 119A. It may be a program stored in another storage medium or in HDD 116. Further, it may be a program written into HDD 116 by another computer connected to LAN 2 via network I/F 118.

It is noted that the storage medium for storing a program is not restricted to flash memory 119A. It may be an optical disc (magneto-optical (MO) disc, mini disc (MD), digital versatile disc (DVD)), an IC card, an optical card, or a semiconductor memory such as a mask ROM, an erasable programmable ROM (EPROM), an EEPROM, or the like.

As used herein, the "program" includes, not only the one directly executable by CPU 111, but also a source program, a compressed program, an encrypted program, and others.

Figure 3:
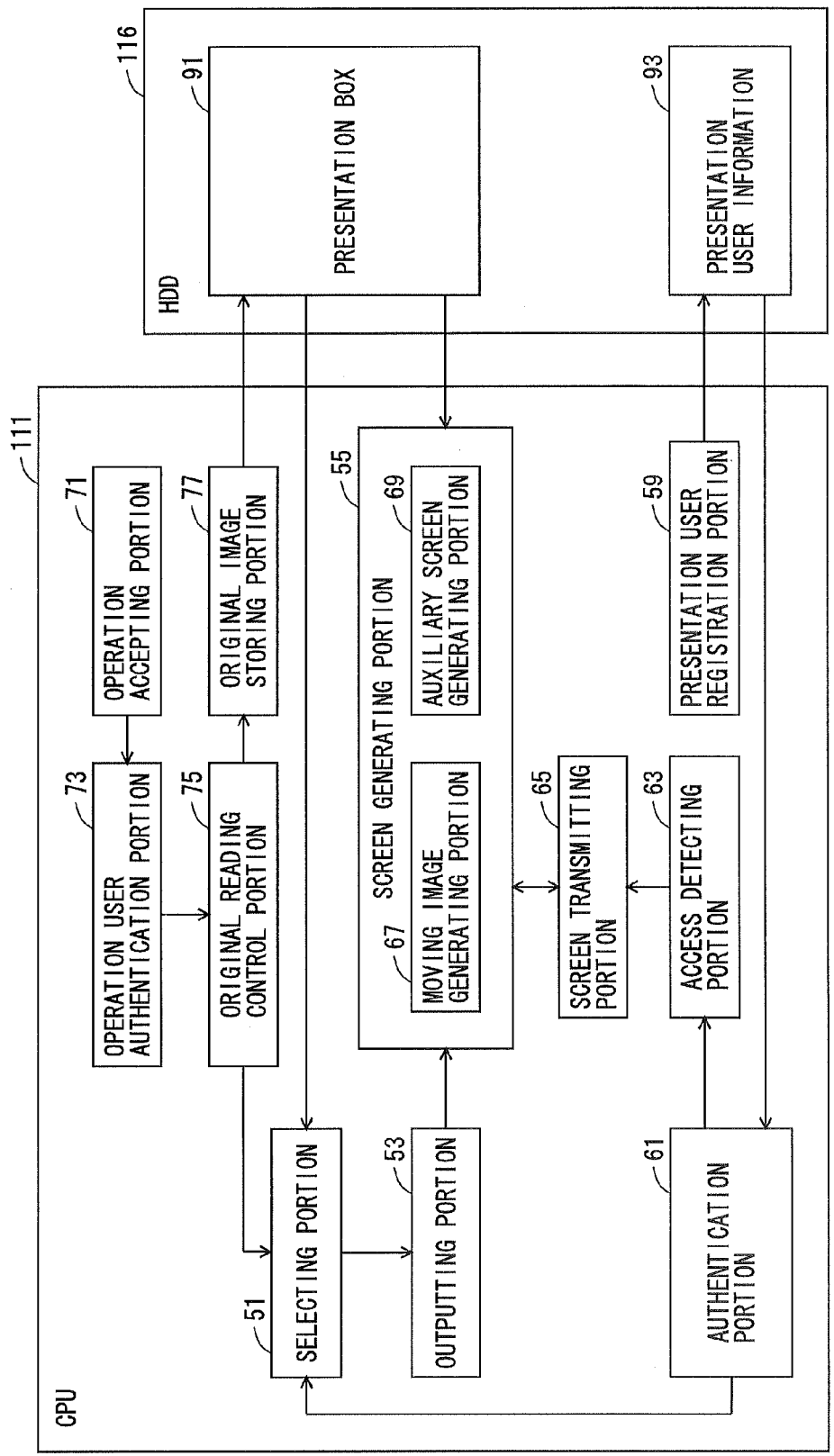
FIG. 3 is a block diagram showing, by way of example, the functions of a CPU included in the MFP, together with data stored in a HDD.

FIG. 3 is a block diagram showing, by way of example, the functions of a CPU included in the MFP, together with data stored in a HDD. The functions shown in FIG. 3 are implemented by CPU 111 included in MFP 100 as CPU 111 executes a screen transmitting program stored in ROM 113, HDD 116, or flash memory 119A. Referring to FIG. 3, HDD 116 includes a presentation box 91, which is one of a plurality of storage areas included in HDD 116, and which is a predetermined storage area. Presentation box 91 stores in advance data including an image of a material which is used by a presentation user for presentation, and data including an image of a reference material which is related to that material.

The functions implemented by CPU 111 include: a selecting portion 51 which selects a piece of data as main data from among one or more pieces of data stored in presentation box 91; an outputting portion 53 which outputs an image of the main data to projector 210; a screen generating portion 55 which generates an access screen including the image of the main data; a presentation user registration portion 59 which registers a predetermined user as a presentation user; an authentication portion 61 which authenticates a user who uses one of PCs 200 and 200A to 200D; an access detecting portion 63 which detects an access to presentation box 91; a screen transmitting portion 65 which transmits the access screen to one of PCs 200 and 200A to 200D that is used by the authenticated user; an operation accepting portion 71 which accepts an operation input into operation portion 129B by a user; an operation user authentication portion 73 which authenticates the user on the basis of the operation accepted by operation accepting portion 71; an original reading control portion 75 which controls original reading portion 123; and an original image storing portion 77 which stores into presentation box 91 an image of the original (or, an original image) output from original reading portion 123.

When network I/F 118 receives a login request from one of PCs 200 and 200A to 200D, authentication portion 61 accepts the login request. Authentication portion 61 authenticates the user who uses the one of PCs 200 and 200A to 200D on the basis of identification information for identifying the user and a password which are included in the login request. Specifically, MFP 100 stores in HDD 116 a combination of identification information and a password for each user registered in advance. If the same combination of identification information and password as that included in the login request is stored in HDD 116, then MFP 100 authenticates the user who is identified by the identification information, to permit the login of the user.

Presentation user registration portion 59 stores identification information of a presentation user who performs a presentation in HDD 116 in advance. As a result, presentation user information 93 is stored in HDD 116. Presentation user information 93 includes the identification information of a presentation user. For example, presentation user registration portion 59 may store in HDD 116 the identification information of a presentation user that is input into operation portion 129B by an administrator of MFP 100. Alternatively, it may receive the identification information of a presentation user from one of PCs 200 and 200A to 200D and store in HDD 116 the received identification information as the identification information of the presentation user. Still alternatively, at the time point when a logged-in user whose login has been permitted by authentication portion 61 stores data in presentation box 91, presentation user registration portion 59 may store in HDD 116 the identification information of the logged-in user as the identification information of the presentation user.

In the case where the logged-in user is a presentation user, authentication portion 61 outputs the identification information of the logged-in, presentation user to selecting portion 51. Authentication portion 61 determines that the logged-in user is a presentation user in the case where the identification information of the logged-in user is included in presentation user information 93. When determining that the logged-in user is a presentation user, authentication portion 61 outputs the identification information of the presentation user to selecting portion 51. When determining that the logged-in user is not a presentation user, authentication portion 61 determines that the logged-in user is a participant user, and outputs the identification information of the participant user to access detecting portion 63. In the following description, it is assumed that the user who is operating PC 200 is a presentation user and the users who are operating PCs 200A to 200D are participant users.

Operation accepting portion 71 accepts an operation which is input into operation portion 129B by a user. Operation accepting portion 71 displays on display portion 129A a login screen including an area for a user to input user identification information and a password, and accepts the identification information and the password input into operation portion 129B by the user. Operation accepting portion 71 outputs the accepted combination of the identification information and the password to operation user authentication portion 73.

When receiving a combination of identification information and a password from operation accepting portion 71, operation user authentication portion 73 authenticates an operation user who is operating MFP 100, on the basis of the combination of the identification information and the password. Specifically, if combinations of user identification information and passwords registered in advance in HDD 116 include the same combination of the identification information and the password as that input from operation accepting portion 71, then operation user authentication portion 73 authenticates the operation user to permit the login of the user. Once operation user authentication portion 73 authenticates the operation user, operation user authentication portion 73 determines that any operation input into operation portion 129B is the operation by the authenticated operation user, until the user logs out. Operation user authentication portion 73 outputs the identification information of the operation user to original reading control portion 75 during the period from when it has authenticated the operation user until when the operation user logs out.

When an operation for causing original reading portion 123 to read an original is input into operation portion 129B while the identification information of the operation user is being input from operation user authentication portion 73, original reading control portion 75 outputs an original image which is output from original reading portion 123 that has read an original to original image storing portion 77, and outputs the identification information of the operation user to selecting portion 51. Original image storing portion 77 stores the original image input from original reading control portion 75 into presentation box 91 in association with the identification information of the operation user.

Selecting portion 51 selects a piece of data as main data from among one or more pieces of data stored in presentation box 91. Specifically, in the case where a logged-in user whose login has been permitted by authentication portion 61 is a prescribed user, selecting portion 51 selects one of the pieces of data stored in presentation box 91 as main data, on the basis of a prescribed operation instructed by the prescribed logged-in user. The prescribed operation includes an operation for causing projector 210 to display an image of data. The prescribed user includes a presentation user and an author of data. In the case where logins of a plurality of users have been permitted by authentication portion 61, selecting portion 51 specifies from among the plurality of logged-in users the one who has performed the prescribed operation, and determines whether the specified logged-in user is the prescribed user.

If the identification information of the logged-in user who has performed an operation for causing projector 210 to display an image of the data designated from among the one or more pieces of data stored in presentation box 91 is identical to that of the presentation user input from authentication portion 61, then selecting portion 51 selects, as the main data, the data designated from among the one or more pieces of data stored in presentation box 91, on the basis of the input operation. Selecting portion 51 then outputs the selected main data to outputting portion 53.

Further, in the case where the operation for causing projector 210 to display an image of the data designated from among the one or more pieces of data stored in presentation box 91 is accepted, if the identification information of the logged-in user who has performed the operation is identical to the identification information of the author of that designated data which has been added thereto as an attribute of the data, then selecting portion 51 selects, as the main data, the data designated from among the one or more pieces of data stored in presentation box 91, on the basis of the input operation, and outputs the selected main data to outputting portion 53.

Further, in the case where selecting portion 51 receives the identification information of an operation user from original reading control portion 75, selecting portion 51 selects, as the main data, one of the pieces of data stored in presentation box 91 that is associated with the identification information of the operation user. The original image stored in presentation box 91 by original image storing portion 77 is associated with the identification information of the operation user. Therefore, the original image read by and output from original reading portion 123 is selected as the main data. A presentation user may select as main data the data stored in advance in presentation box 91 and cause original reading portion 123 to read the original during the presentation, so that the original image obtained by reading the original can be selected as the main data.

When outputting portion 53 receives main data from selecting portion 51, it transmits an image of the main data to projector 210 via communication I/F portion 112. In the case where the main data includes a plurality of pages, outputting portion 53 transmits to projector 210 an image of the page designated by the logged-in user who has selected the main data. It is noted that outputting portion 53 may remotely control projector 210. Specifically, outputting portion 53 may transmit the main data to projector 210 to cause projector 210 to display an image of the main data. In this case, when the main data includes a plurality of pages, outputting portion 53 transmits information that specifies the page designated by the logged-in user to projector 210, to cause projector 210 to display an image of the page designated by the logged-in user. Further, outputting portion 53 outputs the same image as that output to projector 210, to screen generating portion 55.

Access detecting portion 63 receives the identification information of a logged-in user from authentication portion 61, and determined whether the logged-in user has accessed the presentation box in HDD 116. When network I/F 118 receives an instruction to access presentation box 91 from one of PCs 200 and 200A to 200D operated by the logged-in user, it is determined that the logged-in user has accessed the presentation box. For example, in the case where a user who is operating PC 200A causes PC 200A to execute a file searching program and the file searching program displays, in accordance with a user instruction, content of data or a folder stored in presentation box 91 which is set as a shared folder, then PC 200A transmits an instruction to access presentation box 91. When access detecting portion 63 determines that the logged-in user has accessed presentation box 91 in HDD 116, it outputs a transmit instruction to screen transmitting portion 65. The transmit instruction includes the identification information of the logged-in user who has performed the operation of accessing presentation box 91 in HDD 116.

Screen generating portion 55 generates an access screen which includes an image of the main data input from outputting portion 53. The access screen generated by screen generating portion 55 includes, besides the image of the main data, an area for selectably displaying the identification information of sub data, other than the main data, among one or more pieces of data stored in presentation box 91. The sub data is data related to the main data which is presentation data, and includes data of reference materials, data used in the previous presentation, and the like. It is here assumed that the sub data is data created by the same author as the main data. Alternatively, the sub data may be data that was stored in the presentation box at the same date and time as the main data, or may be data that has been recorded by the same logged-in user as the one who has instructed recording of the main data. The area for selectably displaying the identification information of the sub data includes an image such as an icon in which the identification information of the sub data is displayed.

Screen generating portion 55 includes a moving image generating portion 67 and an auxiliary screen generating portion 69. Moving image generating portion 67 converts the image of the main data input from outputting portion 53, into a moving image. When the image of the main data is converted into a moving image by moving image generating portion 67, screen generating portion 55 generates an access screen which includes the moving image generated by moving image generating portion 67. Screen generating portion 55 outputs the generated access screen to screen transmitting portion 65. An access screen including a moving image is advantageous in that, when the access screen is transmitted to any of PCs 200A to 200D, the image of the main data is prevented from being stored in and used secondarily by that PC.

Figure 4:
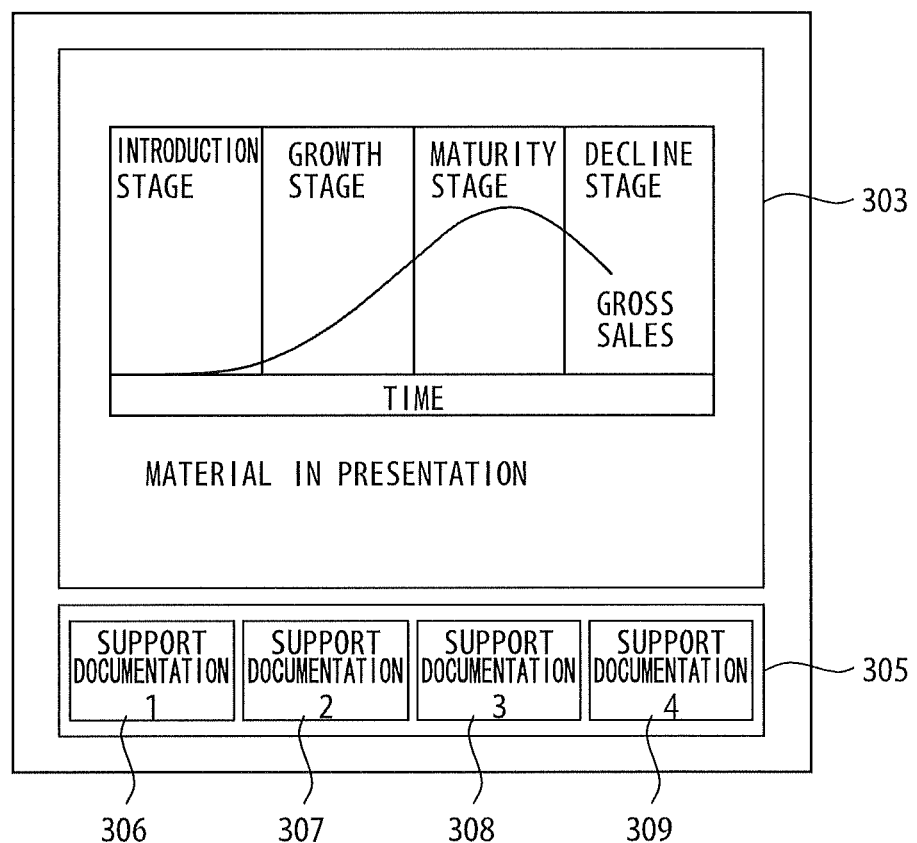
FIG. 4 shows an example of an access screen.

FIG. 4 shows an example of an access screen. Referring to FIG. 4, an access screen 301 includes an area 303 for displaying an image of main data and an area 305 for displaying identification information of sub data other than the main data in a selectable manner. In the case where a moving image is generated by moving image generating portion 67, the moving image is displayed in area 303 for displaying the image of the main data. Area 305 for selectably displaying the identification information of sub data includes images 306 to 309 which include the identification information of four pieces of sub data, respectively. Each of images 306 to 309 can be selected, and access screen 301 includes a first command in accordance with which, when one of images 306 to 309 is designated, a first selecting instruction including the identification information of the sub data corresponding to the designated image is transmitted to MFP 100.

Returning to FIG. 3, screen transmitting portion 65 receives the access screen from screen generating portion 55, and receives the identification information of the logged-in user from access detecting portion 63. Screen transmitting portion 65 transmits the access screen via network I/F 118 to one of PCs 200 and 200A to 200D that is operated by the logged-in, participant user. In the case where the access screen includes a moving image, the moving image is streamed. The one of PCs 200 and 200A to 200D to which the access screen has been transmitted, for example PC 200A, displays the access screen on a display included in PC 200A. The access screen includes the first command to transmit the first selecting instruction to MFP 100 in response to designation of one of images 306 to 309. Therefore, when a user of PC 200A input to PC 200A an operation of designating one of images 306 to 309, PC 200A transmits the first selecting instruction to MFP 100. The first selecting instruction includes the identification information of the selected sub data.

When network I/F 118 receives the first selecting instruction transmitted from PC 200A, among PCs 200 and 200A to 200D, to which the access screen has been transmitted, screen transmitting portion 65 outputs the first selecting instruction to screen generating portion 55.

On receipt of the first selecting instruction, auxiliary screen generating portion 69 in screen generating portion 55 generates an auxiliary screen which includes: an image of the sub data specified by the identification information included in the first selecting instruction; an area for selectably displaying the identification information of sub data that has not been selected and the identification information of the main data; the first command to transmit the first selecting instruction to MFP 100 when one of the identification information of the sub data selectably displayed is designated; and a second command to transmit a second selecting instruction to MFP 100 when the identification information of the main data selectably displayed is designated. Auxiliary screen generating portion 69 outputs the generated auxiliary screen to screen transmitting portion 65. The second selecting instruction includes the identification information of the main data.

When screen transmitting portion 65 receives an auxiliary screen from auxiliary screen generating portion 69, it transmits the auxiliary screen via network I/F 118 to one of PCs 200 and 200A to 200D that issued the first selecting instruction. The one of PCs 200 and 200A to 200D to which the auxiliary screen has been transmitted, for example PC 200A, displays the auxiliary screen on the display included in PC 200A. The auxiliary screen includes the area for selectably displaying the identification information of the main data and the identification information of the sub data, the first command to transmit the first selecting instruction to MFP 100, and the second command to transmit the second selecting instruction to MFP 100. Therefore, when the user of PC 200A inputs to PC 200A an operation of selecting the identification information of the sub data displayed in a selectable manner, PC 200A transmits the first selecting instruction to MFP 100, while when the user of PC 200A inputs to PC 200A an operation of selecting the identification information of the main data displayed in a selectable manner, PC 200A transmits the second selecting instruction to MFP 100.

When network I/F 118 receives the second selecting instruction transmitted from PC 200A, among PCs 200 and 200A to 200D, to which the auxiliary screen has been transmitted, screen transmitting portion 65 outputs the second selecting instruction to screen generating portion 55. On receipt of the second selecting instruction, screen generating portion 55 transmits the access screen via network I/F 118 to PC 200A, among PCs 200 and 200A to 200D, that issued the second selecting instruction.

Figure 5:
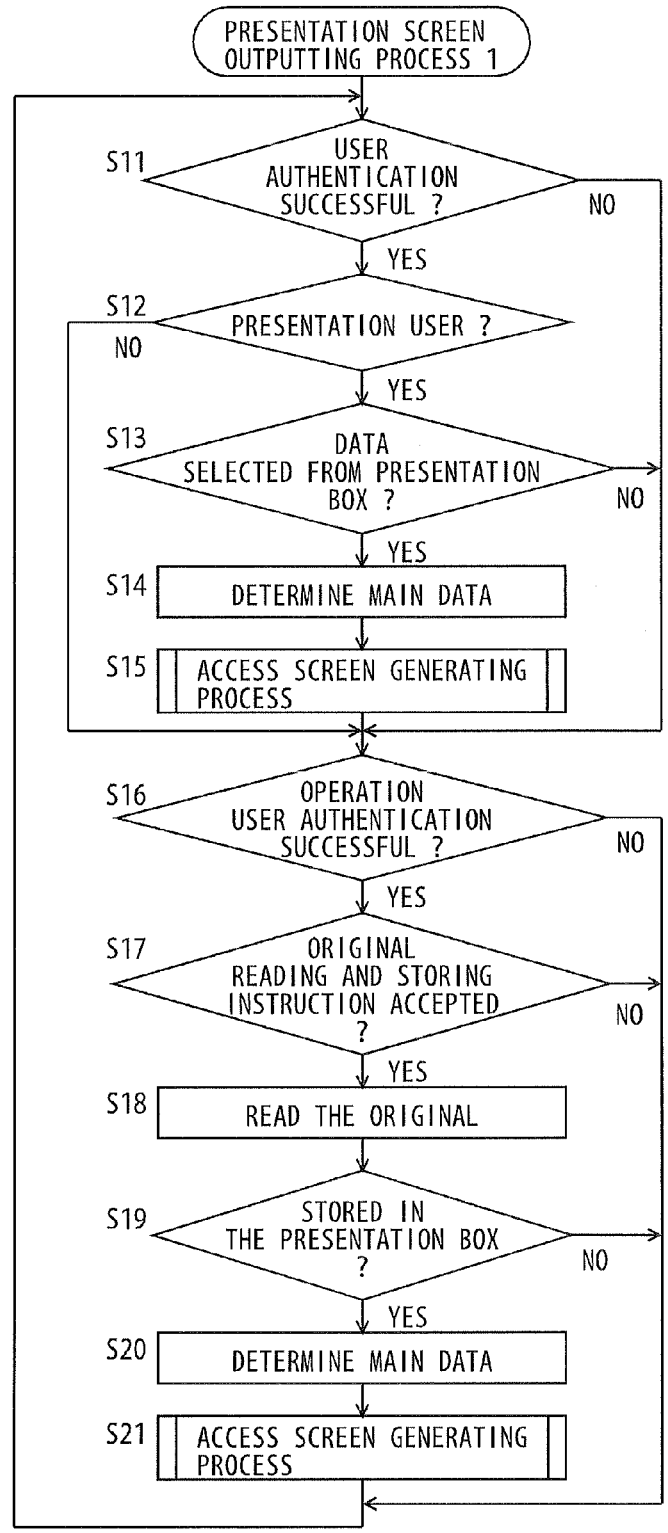
FIG. 5 is a flowchart illustrating an example of the flow of a presentation screen outputting process.

FIG. 5 is a flowchart illustrating an example of the flow of a presentation screen outputting process. The presentation screen outputting process is carried out by CPU 111 included in MFP 100 as CPU 111 executes a screen transmitting program stored in ROM 113, HDD 116, or flash memory 119A. Referring to FIG. 5, CPU 111 determines whether user authentication is successful (step S11). If so, the process proceeds to step S12; otherwise, the process proceeds to step S16. The user authentication is performed on the basis of a login request which is received by network I/F 118 from one of PCs 200 and 200A to 200D. In the case where network I/F 118 receives a login request from one of PCs 200 and 200A to 200D, if the same combination of the identification information and the password as that included in the login request is found among the combinations of user identification information and passwords registered in advance in HDD 116, then CPU 111 authenticates the user identified by that identification information to permit the user's login.

In step S12, it is determined whether the authenticated logged-in user is a presentation user. If the identification information included in presentation user information 93 stored in advance in HDD 116 includes the identification information of the logged-in user, the authenticated logged-in user is determined to be a presentation user. If so, the process proceeds to step S13; otherwise, the process proceeds to step S16. In step S13, it is determined whether data stored in presentation box 91 has been selected as data to be output to projector 210. If any piece of the data stored in presentation box 91 has been selected as the data to be output to projector 210, the process proceeds to step S14; otherwise, the process proceeds to step S16.

In the following step S14, the data that has been selected in step S13 as the data to be output to projector 210 is determined as main data. In the following step S15, CPU 111 performs an access screen generating process, and the process proceeds to step S16. The access screen generating process, which will be described later in detail, is a process of generating an access screen which includes an image of the data that has been determined as the main data in step S14.

In step S16, it is determined whether operation user authentication is successful. If so, the process proceeds to step S17; otherwise, the process returns to step S11. In the case where a combination of identification information and a password is input into operation portion 129B, if the same combination as the input one is found among the combinations of the user identification information and the passwords registered in advance in HDD 116, CPU 111 authenticates the user identified by that identification information, to permit the user's login as an operation user.

In step S17, it is determined whether an original reading and storing instruction has been accepted. If so, the process proceeds to step S18; otherwise, the process returns to step S11. The original reading and storing instruction is an instruction to cause original reading portion 123 to read an original and store an original image obtained by reading the original into a designated area in HDD 116. In step S18, CPU 111 controls original reading portion 123 to read an original, and accepts an original image output from original reading portion 123 that has read the original. In the following step S19, it is determined whether the original image has been stored in presentation box 91. If so, the process proceeds to step S20; otherwise, the process returns to step S11.

In step S20, the original image which has been stored in presentation box 91 is determined as main data. In the following step S21, CPU 111 performs the access screen generating process as in step S15, and the process returns to step S11.

In the presentation screen outputting process shown in FIG. 5, the main data determined in step S14 is the data that is selected by the logged-in user who has been determined to be a presentation user in step S12. In place of or in addition to this, it may be configured such that, when a logged-in user selects from among the data stored in presentation box 91 a piece of data whose author is the logged-in user, the selected data is determined as the main data.

Figure 6:
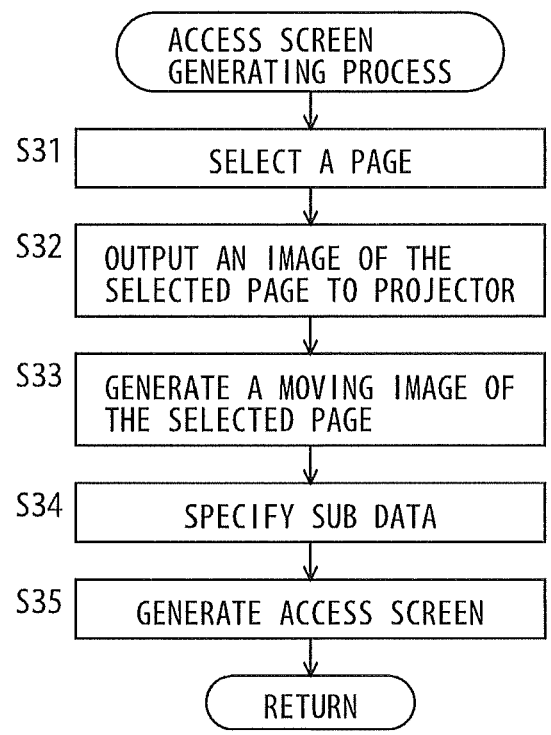
FIG. 6 is a flowchart illustrating an example of the flow of an access screen generating process.

FIG. 6 is a flowchart illustrating an example of the flow of the access screen generating process. The access screen generating process is performed in steps S15 and S21 in the presentation screen outputting process shown in FIG. 5. In the presentation screen outputting process, main data is determined in the step preceding the access screen generating process. The access screen generating process is performed on the main data that is determined before the execution thereof.

Referring to FIG. 6, CPU 111 selects a page from among one or more pages included in the main data (step S31). In the following step S32, CPU 111 outputs an image of the page selected in step S31, to projector 210. As a result, the image of the selected page is displayed by projector 210.

In the following step S33, a moving image is generated from the image of the selected page which has been output to projector 210. In the following step S34, sub data related to the main data is specified. Then, an access screen including the moving image obtained by converting the image of the selected page and an area for selectably displaying the identification information of the sub data is generated (step S35), and the process returns to the presentation screen outputting process. The area for selectably displaying the identification information of the sub data includes an image such as an icon in which the identification information of the sub data is displayed.

Figure 7:
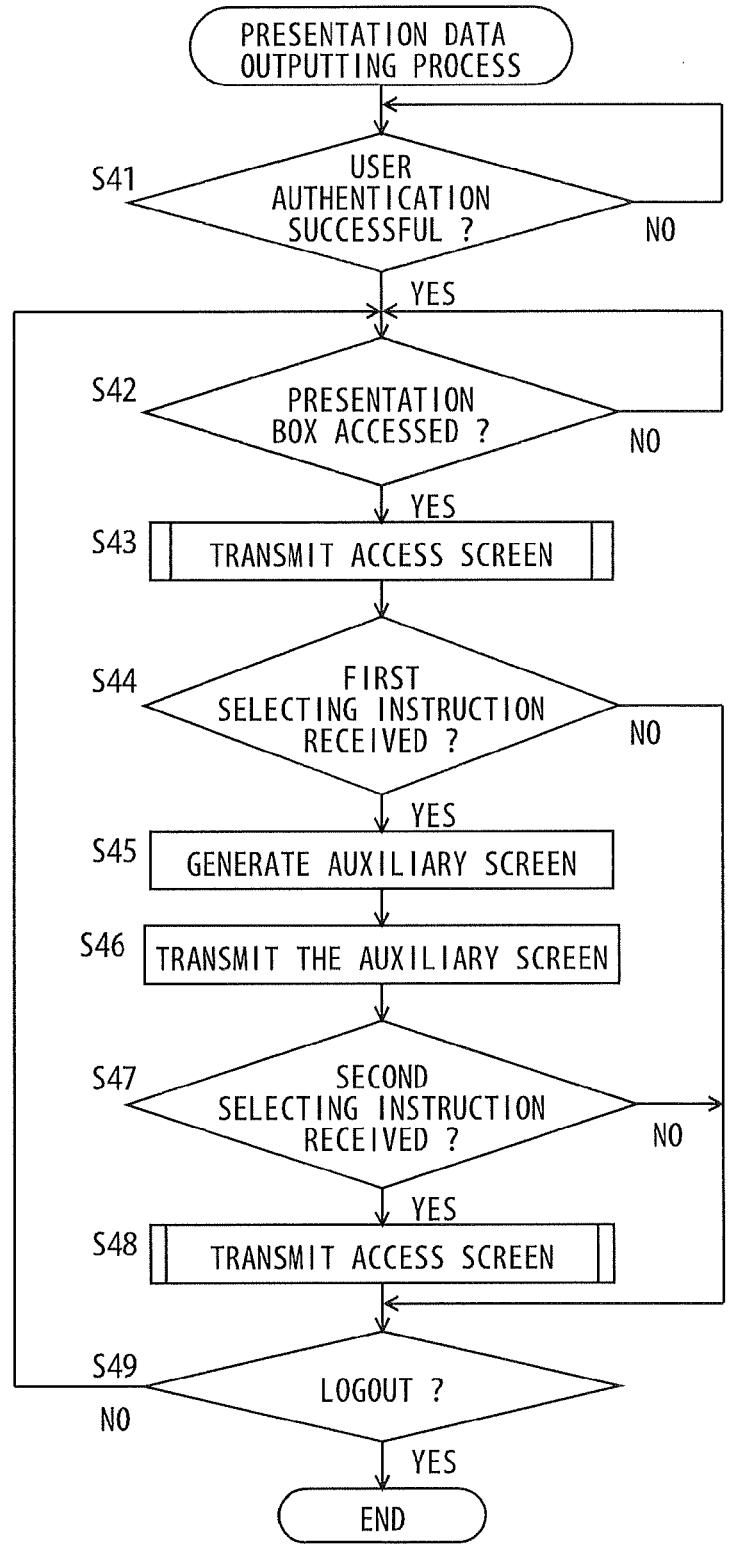
FIG. 7 is a flowchart illustrating an example of the flow of a presentation data outputting process.

FIG. 7 is a flowchart illustrating an example of the flow of a presentation data outputting process. The presentation data outputting process is carried out by CPU 111 included in MFP 100 as CPU 111 executes the screen transmitting program stored in ROM 113, HDD 116 or flash memory 119A.

Referring to FIG. 7, CPU 111 determines whether user authentication is successful (step S41). CPU 111 is in a standby mode until user authentication succeeds (NO in step S41), and once the user authentication has succeeded (YES in step S41), the process proceeds to step S42. The user authentication is performed on the basis of a login request which is received by network I/F 118 from one of PCs 200 and 200A to 200D. In the case where network I/F 118 receives a login request from one of PCs 200 and 200A to 200D, if the same combination of the identification information and the password as that included in the login request is found among the combinations of user identification information and passwords registered in advance in HDD 116, CPU 111 authenticates the user identified by that identification information, to permit the login of the user. It is here assumed that a login request is received from PC 200A and the user authentication is successful.

In step S42, it is determined whether an operation of accessing presentation box 91 has been accepted. When network I/F 118 receives a command to access presentation box 91 from PC 200A which is operated by the logged-in user who has been authenticated in step S41, CPU 111 accepts the operation of accessing presentation box 91. CPU 111 is in a standby mode until it receives a command to access presentation box 91 (NO in step S42), and once CPU 111 receives the command to access presentation box 91 (YES in step S42), the process proceeds to step S43.

In step S43, CPU 111 transmits the access screen to PC 200A which is operated by the user authenticated in step S41. The access screen is generated as the access screen generating process shown in FIG. 6 is performed in step S15 or S21 in the presentation screen outputting process shown in FIG. 5. As the access screen is transmitted to PC 200A, the access screen is displayed on a display of PC 200A. As previously described, the access screen includes the image which is being displayed by projector 210, allowing the same image as that being displayed by projector 210 to be viewed on the display of PC 200A. The access screen also includes the area for selectably displaying the identification information of the sub data related to the main data, and the first command to transmit the first selecting instruction to MFP 100 when the identification information of the sub data is designated. In PC 200A, when the identification information of the sub data included in the access screen is designated, PC 200A transmits the first selecting instruction to MFP 100.

In the following step S44, it is determined whether the first selecting instruction has been received. If so, the process proceeds to step S45; otherwise, the process proceeds to step S49. In step S45, an auxiliary screen is generated. In the following step S46, the generated auxiliary screen is transmitted to PC 200A which is operated by the user authenticated in step S41. The auxiliary screen includes an image of the sub data. This allows the user of PC 200A to view, on the display of PC 200A, an image that is different from the image of the main data being displayed by projector 210 and that is an image of the data related to the image of the main data. The auxiliary screen includes the area for selectably displaying the identification information of the main data and the second command to transmit the second selecting instruction to MFP 100 when the identification information of the main data is designated. In PC 200A, when the identification information of the main data included in the auxiliary screen is designated, PC 200A transmits the second selecting instruction to MFP 100.

In the following step S47, it is determined whether the second selecting instruction has been received. If so, the process proceeds to step S48; otherwise, the process proceeds to step S49. In step S48, as in step S43, CPU 111 transmits the access screen to PC 200A to which the auxiliary screen was transmitted in step S46. On the access screen that is displayed after the auxiliary screen is viewed, the same image as that being displayed by projector 210 is displayed. Therefore, there may be a case where the access screen transmitted to PC 200A in step 43 and the access screen transmitted to PC 200A in step S48 include images of different pages among a plurality of pages included in the main data, depending on the progress of the presentation.

In step S49, it is determined whether a logout instruction has been detected. For example, when the user of PC 200A inputs a logout operation, or when network I/F 118 closes the session for communicating with PC 200A, CPU 111 detects a logout instruction. If the logout instruction has been detected, the process is terminated; otherwise, the process returns to step S42.

Figure 8:
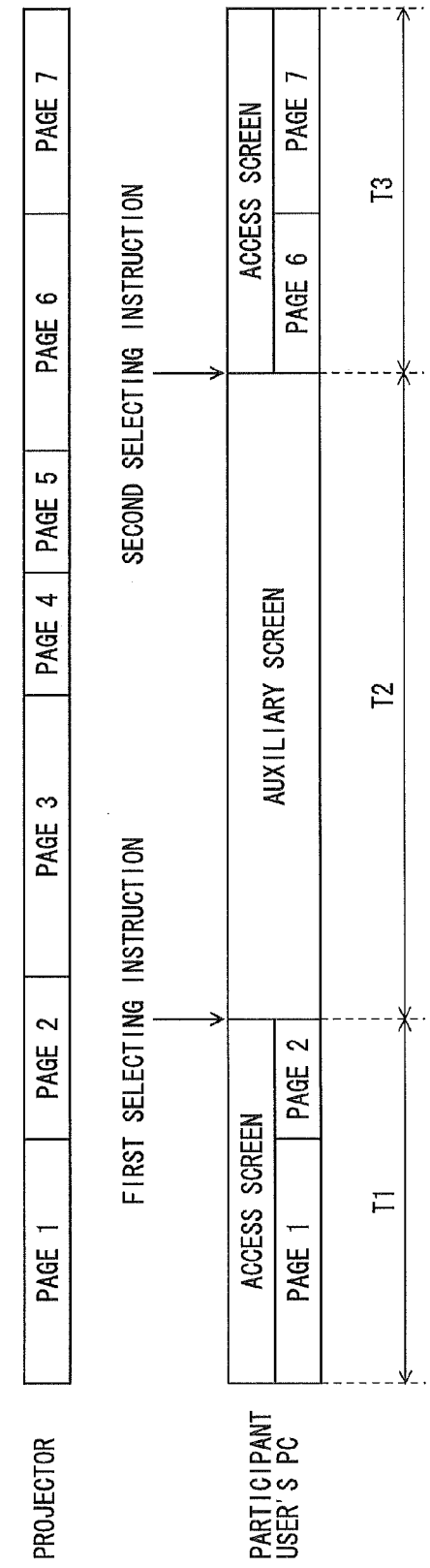
FIG. 8 shows, by way of example, the relationship between the pages displayed on a projector and the screens displayed on a PC that is operated by a logged-in user in chronological order.

FIG. 8 shows, by way of example, the relationship between the pages displayed on the projector and the screens displayed on a PC operated by a logged-in user in chronological order. Referring to FIG. 8, the horizontal axis represents the flow of time, and page numbers of the pages, among a plurality of pages included in the main data, that are displayed by projector 210 are shown in the upper part, and screens that are displayed on PC 200A operated by the logged-in user are shown in the lower part. Referring to the upper part, it is shown that the first through seventh pages in the main data are displayed in this order at different intervals by projector 210. Referring to the lower part, it is shown that an access screen is displayed on PC 200A of the participant user during a period T1, a first selecting instruction is input to PC 200A after a lapse of the period T1, and thereafter, a second selecting instruction is input to PC 200A after a lapse of a period T2.

During the period T1 and a period T3, the access screen is displayed on PC 200A. The access screens displayed on PC 200A during the period T1 and the period T3 are synchronized with the images being displayed by projector 210, thus including the same images as those of the pages of the main data being displayed by projector 210. During the period T2, the auxiliary screen is displayed on PC 200A of the participant user. During the period T2, the participant user is able to see the image of the data related to the main data on the auxiliary screen being displayed on PC 200A, while seeing the image of the page in the main data being displayed by projector 210. Further, the access screen that is displayed on PC 200A after the second selecting instruction is input to PC 200A includes the same image as that of the page of the main data being displayed by projector 210. This eliminates the need for the participant user who is operating PC 200A to perform a page switching operation or the like.

As described above, in conference system 1 of the present embodiment, MFP 100 authenticates users of PCs 200 and 200A to 200D on the basis of identification information received from the respective ones of PCs 200 and 200A to 200D, selects as main data a piece of data from among one or more pieces of data stored in presentation box 91 in HDD 116, and generates an access screen including an image of the main data. When detecting an access to presentation box 91 by an authenticated user, MFP 100 transmits the access screen to one of PCs 200 and 200A to 200D that is operated by the user who has performed the operation of accessing presentation box 91. Accordingly, when a user who uses one of PCs 200 and 200A to 200D performs an operation of accessing presentation box 91, the access screen including the image of the main data selected from among the one or more pieces of data stored in presentation box 91 is displayed on the one of PCs 200 and 200A to 200D. This allows the same access screen to be displayed on all of PCs 200 and 200A to 200D once a piece of main data is selected.

In the case where the data which has been selected by a presenter or an author of the data from among one or more pieces of data stored in presentation box 91 in HDD 116 is selected as the main data and an access to presentation box 91 by a participant user who is using one of PCs 200A to 200D has been detected, an access screen is transmitted to the one of PCs 200A to 200D that is used by the authenticated participant user. This allows the image of the data selected by the presenter or the author to be displayed on PCs 200A to 200D used by the participant users.

In the case where the logged-in user is a presentation user who has been registered in advance, the logged-in presentation user selects, as main data, a piece of data among the one or more pieces of data stored in presentation box 91 that has been designated as presentation data. This allows the image of the presentation data to be displayed on PCs 200A to 200D used by the participant users.

In the case where a presenter or an author of data performs, on a piece of data among the one or more pieces of data stored in presentation box 91, an operation of outputting the data to projector 210 or an operation of opening the data, that data is selected as the main data. This allows the data designated for the presentation by the presenter or the author of the data to be displayed on PCs 200A to 200D used by the participant users.

In the case where a presenter operates operation panel 129 in MFP 100 to cause an original to be read and stored in presentation box 91, the original image is selected as the main data. Accordingly, the presenter is only necessary to perform the operation of causing an original to be read and stored in the presentation box in order to select the main data and cause the original image to be displayed on PCs 200A to 200D used by the participant users.

In the case where the main data includes a plurality of pages, an image of the page selected from among the plurality of pages is output to projector 210 for display. The access screen includes the image of the selected page, allowing the same image as that of the selected page being displayed by projector 210 to be displayed on PCs 200A to 200D used by the participant users.

In the case where the access screen includes a moving image obtained by converting the image of the main data, MFP 100 streams the moving image to PCs 200A to 200D to which the access screen is transmitted. This prevents the image of the main data from being stored in and used secondarily by PCs 200A to 200D.

Second Embodiment

In MFP 100 according to the first embodiment, in the case where data stored in presentation box 91 in HDD 116 is selected by a presentation user or an author of the data, the selected data is selected as the main data. In a MFP 100 according to a second embodiment, one or more presentation users and one or more pieces of data are stored in advance, in association with each other, in presentation box 91 in HDD 116, and data that is associated with the presentation user who has been selected as a presenter is selected as the main data.

The overall configuration of conference system 1 according to the second embodiment is identical to that shown in FIG. 1, and the hardware configuration of MFP 100 according to the second embodiment is identical to that shown in FIG. 2. Therefore, the description thereof will not be repeated here.

Figure 9:
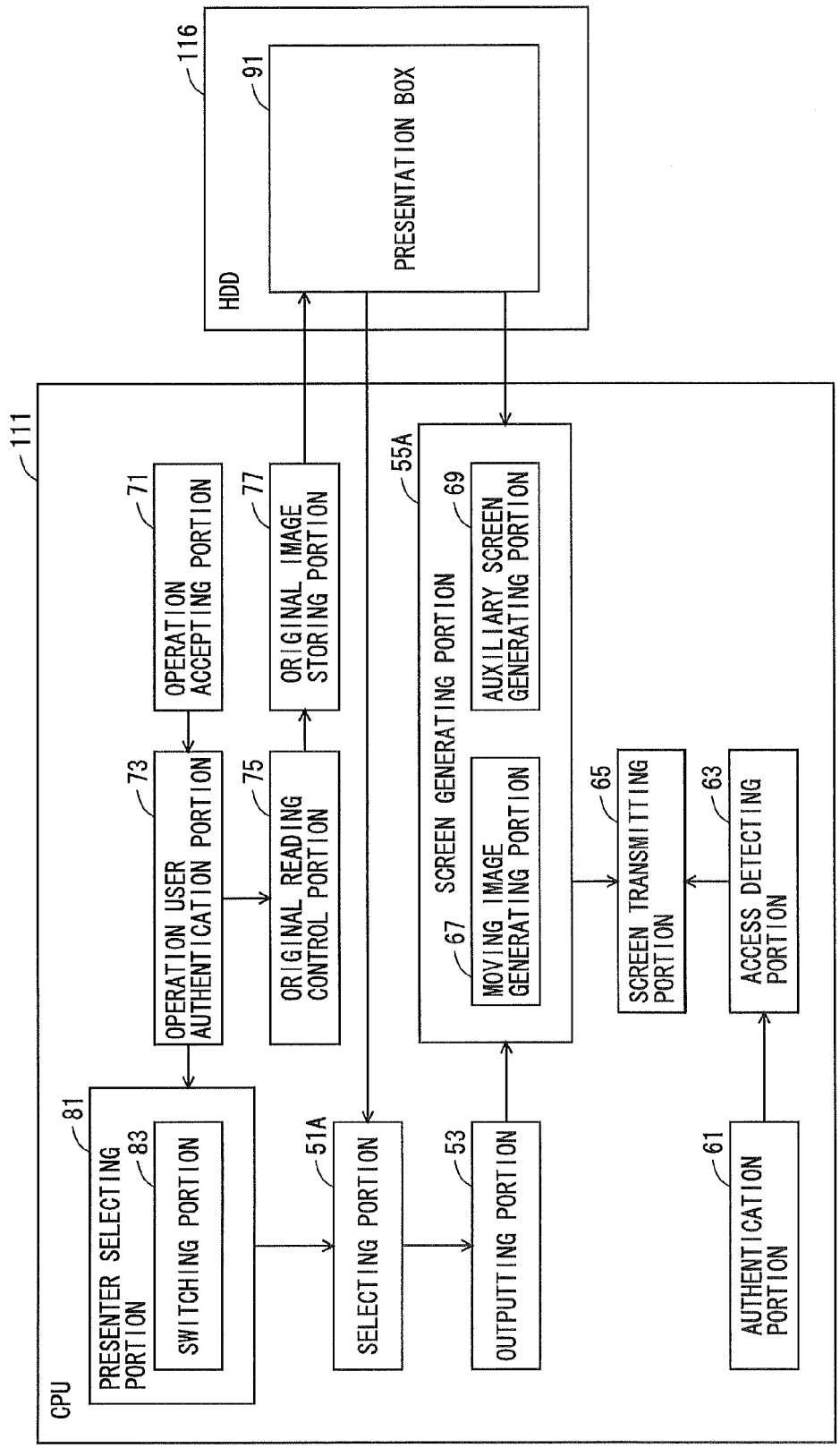
FIG. 9 is a block diagram showing, by way of example, the functions of a CPU included in the MFP according to a second embodiment, together with data stored in a HDD.

FIG. 9 is a block diagram showing, by way of example, the functions of a CPU included in the MFP according to the second embodiment, together with data stored in HDD 116. The block diagram in FIG. 9 is different from that shown in FIG. 3 in that a presenter selecting portion 81 has been added, selecting portion 51 and screen generating portion 55 have been changed to a selecting portion 51A and a screen generating portion 55A, respectively, and presentation user registration portion 59 has been deleted. The other functions are similar to those shown in FIG. 3, and thus, the description thereof will not be repeated here.

In presentation box 91 in HDD 116, data including an image of a material used by a presenter for a presentation and data including an image of a reference material related to the material are stored in advance in association with the identification information of the presentation user.

Presenter selecting portion 81 selects, as a presenter, a presentation user from among one or more presentation users who are associated with one or more pieces of data stored in presentation box 91. For example, presenter selecting portion 81 selects, as a first presenter, the presentation user who is associated with the data that has been stored earliest in presentation box 91 among the one or more pieces of data stored in presentation box 91. Alternatively, presenter selecting portion 81 selects, as a first presenter, the presentation user who is associated with the data that has been accessed firstly among the one or more pieces of data stored in presentation box 91. Presenter selecting portion 81 outputs the identification information of the presentation user who has been selected as a presenter, to selecting portion 51A.

Selecting portion 51A receives the identification information of the presentation user from presenter selecting portion 81, and selects one of the pieces of data stored in presentation box 91 as main data, on the basis of the identification information of the presentation user. Specifically, selecting portion 51A selects, from among the one or more pieces of data stored in presentation box 91, the data associated with the identification information of the presentation user received from presenter selecting portion 81, as the main data.

Screen generating portion 55A generates a selective access screen which includes an image of the main data input from outputting portion 53. The selective access screen corresponds to the access screen shown in the first embodiment to which a presentation user switching function has been added. The selective access screen generated by screen generating portion 55A includes, besides the image of the main data, an area for selectably displaying the identification information of sub data, other than the main data, among the one or more pieces of data stored in presentation box 91, a first command to transmit to MFP 100 a first selecting instruction including the identification information of the sub data, an area for selectably displaying the identification information of presentation users, and a third command to transmit to MFP 100 a presenter switching instruction including the identification information of a presentation user. The area for selectably displaying the identification information of the presentation users displays, in a selectable manner, the identification information of one or more presentation users associated with one or more pieces of data stored in presentation box 91, and includes an image such as an icon in which the identification information of a presentation user is displayed.

Figure 10:
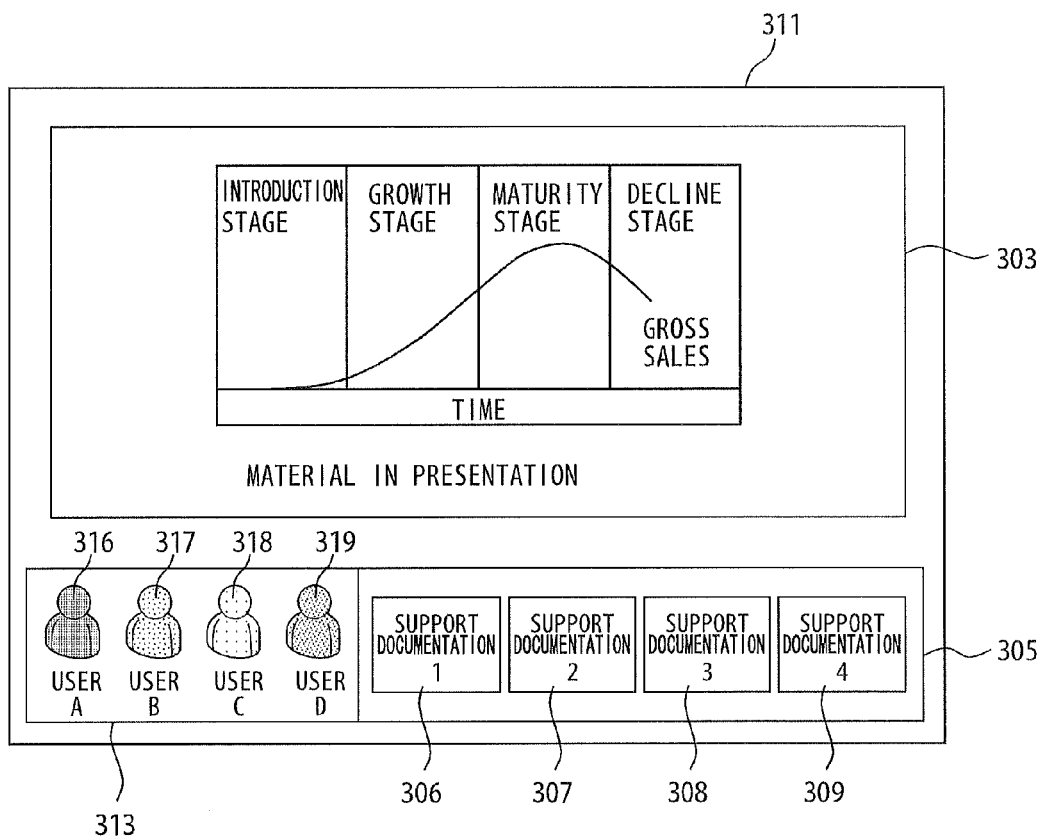
FIG. 10 shows an example of a selective access screen.

FIG. 10 shows an example of a selective access screen. Referring to FIG. 10, a selective access screen 311 includes an area 303 for displaying an image of main data, an area 305 for selectably displaying the identification information of sub data other than the main data, and an area 313 for selectably displaying the identification information of presentation users. Area 305 for selectably displaying the identification information of the sub data includes images 306 to 309 which respectively include the identification information of four pieces of sub data. Each of images 306 to 309 can be selected, and selective access screen 311 includes the first command in accordance with which, when one of images 306 to 309 is designated, a first selecting instruction including the identification information of the sub data corresponding to the designated image is transmitted to MFP 100. The area 313 for selectably displaying the identification information of the presentation users includes images 316 to 319 which respectively include the identification information of four presentation users. Each of images 316 to 319 can be selected, and selective access screen 311 includes the third command in accordance with which, when one of images 316 to 319 is designated, a presenter switching instruction including the identification information of the presentation user corresponding to the designated image is transmitted to MFP 100.

Returning to FIG. 9, screen generating portion 55A includes a moving image generating portion 67 and an auxiliary screen generating portion 69. Moving image generating portion 67 converts an image of the main data input from outputting portion 53, into a moving image. Screen generating portion 55A generates a selective access screen which includes the moving image generated by moving image generating portion 67. Screen generating portion 55A outputs the selective access screen to screen transmitting portion 65. Auxiliary screen generating portion 69 is identical to that in the first embodiment, and thus, the description thereof will not be repeated here.

Screen transmitting portion 65 receives the selective access screen from screen generating portion 55A, and transmits the selective access screen via network I/F 118 to one of PCs 200 and 200A to 200D which is operated by the logged-in user. In the case where the selective access screen includes a moving image, the moving image is streamed. The one of PCs 200 and 200A to 200D to which the selective access screen has been transmitted, for example PC 200A, displays the selective access screen on a display included in PC 200A. The selective access screen includes the area for selectably displaying the identification information of the presentation users and the third command to transmit to MFP 100 the presenter switching instruction including the identification information of a presentation user. Therefore, when a user of PC 200A inputs to PC 200A an operation of selecting the identification information of the presentation user, PC 200A transmits the presenter switching instruction to MFP 100. The presenter switching instruction includes the identification information of the selected presentation user.

Presenter selecting portion 81 includes a switching portion 83. Switching portion 83 switches a presenter from the presentation user who has been selected as the presenter to another presentation user among the one or more presentation users who are respectively associated with the one or more pieces of data stored in presentation box 91. When network I/F 118 receives a presenter switching instruction transmitted from PC 200A to which the selective access screen has been transmitted, switching portion 83 switches the presenter from the presentation user who has been selected as the presenter at that time, to the presentation user who is identified by the identification information included in the presenter switching instruction. Switching portion 83 outputs the identification information of the newly designated presenter to selecting portion 51A.

Further, when switching portion 83 receives identification information of an operation user from original reading control portion 75, it switches the presenter from the presentation user who has been selected as the presenter at that time, to the presentation user who is specified by the identification information of the operation user received from original reading control portion 75. Switching portion 83 outputs the identification information of the newly designated presenter to selecting portion 51A.

In the case where the identification information of an operation user is input from switching portion 83 to selecting portion 51A, an original image is stored in presentation box 91 by original image storing portion 77. At this time, the original image is associated with the identification information of the operation user. Therefore, when selecting portion 51A receives the identification information of the operation user from presenter selecting portion 81, it selects the original image read by and output from original reading portion 123 as the main data. A presenter may cause original reading portion 123 to read an original during the presentation, so as to cause selecting portion 51A to select the original image obtained by reading the original as the main data. As a result, an image including the original image is displayed by projector 210, while the selective access screen including the original image is transmitted to the participant's PC 200A.

Figure 11:
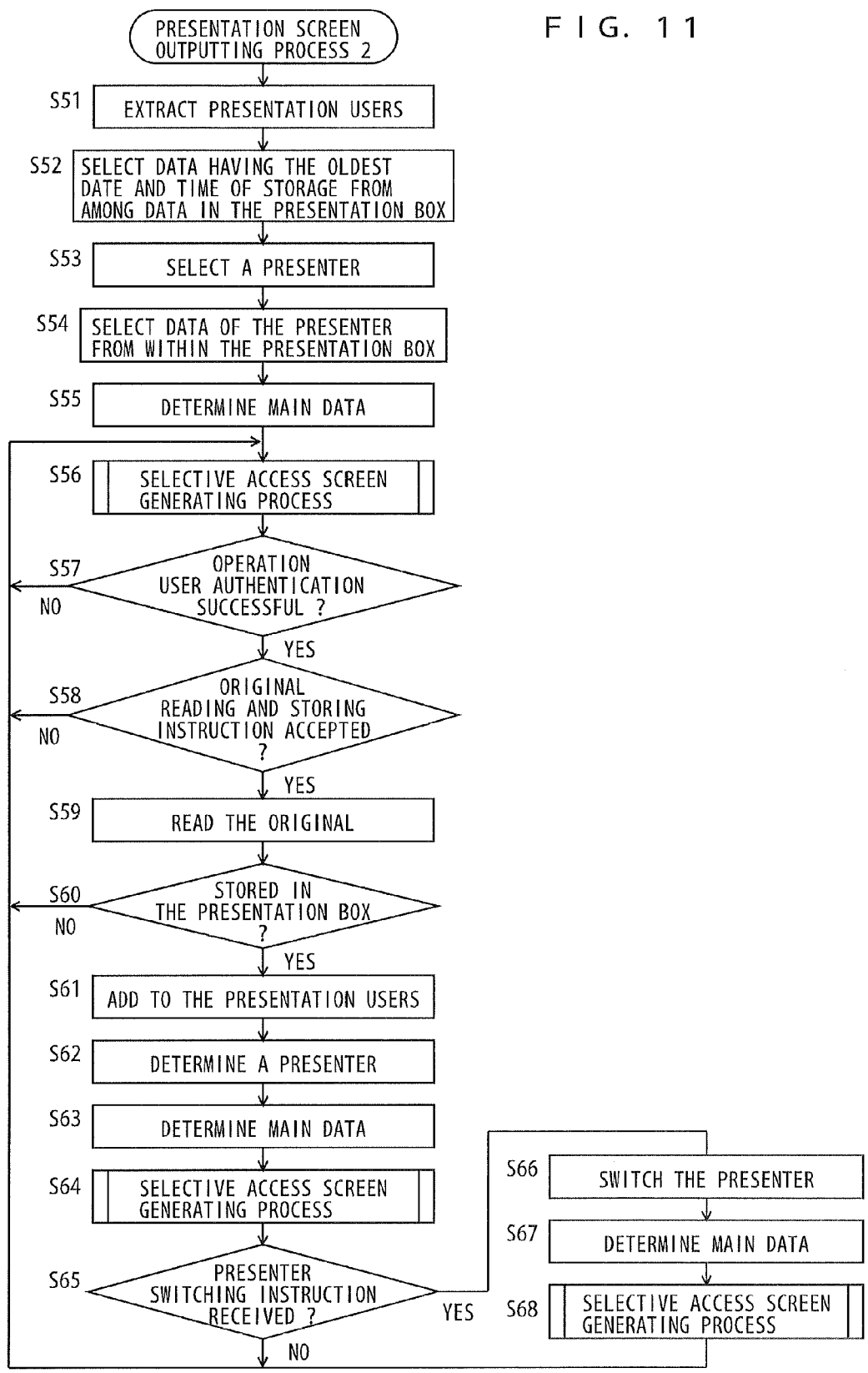
FIG. 11 is a flowchart illustrating an example of the flow of the presentation screen outputting process according to the second embodiment.

FIG. 11 is a flowchart illustrating an example of the flow of a presentation screen outputting process according to the second embodiment. The presentation screen outputting process is carried out by CPU 111 included in MFP 100 as CPU 111 executes a screen transmitting program stored in ROM 113, HDD 116, or flash memory 119A.

Referring to FIG. 11, CPU 111 extracts one or more presentation users who are respectively associated with one or more pieces of data stored in presentation box 91 (step S51). In the following step S52, CPU 111 selects, from among the one or more pieces of data stored in presentation box 91, the data having the oldest date and time when the same was stored in the presentation box. CPU 111 then selects the presentation user whose identification information is associated with the selected data, as a presenter (step S53).

In the following step S54, a piece of data, among the one or more pieces of data stored in presentation box 91, that is associated with the identification information of the presentation user selected as a presenter in step S53, is selected as the presenter's data. Further, the data selected in step S54 is determined as the main data (step S55). In the following step S56, a selective access screen generating process is performed, and the process proceeds to step S57. The selective access screen generating process will be described in detail later.

In the following step S57, it is determined whether authentication of an operation user is successful. If so, the process proceeds to step S58; otherwise, the process returns to step S56. When a combination of identification information and a password is input into operation portion 129B, if the same combination as the input one is found among the combinations of user identification information and passwords registered in advance in HDD 116, CPU 111 authenticates the user identified by the identification information, to permit the login as an operation user.

In step S58, it is determined whether an original reading and storing instruction has been accepted. If so, the process proceeds to step S59; otherwise, the process returns to step S56. In step S59, CPU 111 controls original reading portion 123 to read an original, and accepts an original image output from original reading portion 123 that has read the original. In the following step S60, it is determined whether the original image has been stored in presentation box 91. If so, the process proceeds to step S61; otherwise, the process returns to step S56.

In step S61, the operation user is added to the presentation users extracted in step S51. If the presentation user having the same identification information as that of the operation user has been extracted in step S51, the operation user is not added to the presentation users.

In the following step S62, the operation user who has been authenticated in step S57 is determined as a presenter, and the process proceeds to step S63. In the following step S63, of the one or more pieces of data stored in presentation box 91, the data associated with the identification information of the presenter, i.e. the operation user, is determined as the main data. The data associated with the identification information of the operation user is the original image which has been stored in presentation box 91 in step S60. Then, in step S64, as in step S56, CPU 111 generates a selective access screen on the basis of the main data determined in step S63, and the process proceeds to step S65.

In MFP 100 according to the second embodiment, CPU 111 performs the presentation data outputting process shown in FIG. 7. When the presentation data outputting process shown in FIG. 7 is performed by CPU 111, the access screen transmitting process is performed in step S43 or S48, and selective access screen 311 shown in FIG. 10 for example is transmitted to one of PCs 200 and 200A to 200D. In the one of PCs 200 and 200A to 200D that has received selective access screen 311, for example in PC 200A, selective access screen 311 is displayed on its display. When a user of PC 200A designates one of icons 316 to 319 of the presentation users included in selective access screen 311, PC 200A transmits a presenter switching instruction to MFP 100. The presenter switching instruction includes the identification information of the presentation user corresponding to the designated icon.

In step S65, it is determined whether a presenter switching instruction has been received. Specifically, it is determined whether network I/F 118 has received the presenter switching instruction from the one of PCs 200 and 200A to 200D to which the selective access screen was transmitted. If the presenter switching instruction has been received, the process proceeds to step S66; otherwise, the process returns to step S56.

In step S66, CPU 111 switches the presenter to a presentation user who is identified by the identification information included in the presenter switching instruction. In the following step S67, main data is determined. Specifically, of the one or more pieces of data stored in presentation box 91 in HDD 116, the data that is associated with the identification information of the presentation user who has been newly designated as the presenter in step S66 is determined as the main data. Then, in step S68, as in step S56, the selective access screen generating process is performed on the basis of the main data determined in step S67, and the process returns to step S56.

Figure 12:
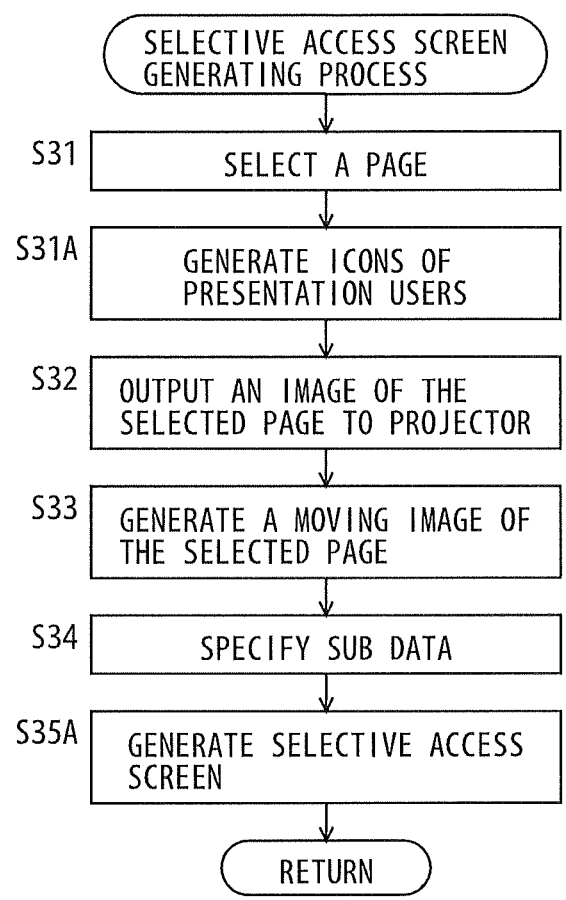
FIG. 12 is a flowchart illustrating an example of the flow of a selective access screen generating process.

FIG. 12 is a flowchart illustrating an example of the flow of a selective access screen generating process. In the presentation screen outputting process shown in FIG. 11, main data is determined in the step preceding the selective access screen generating process. Therefore, the selective access screen generating process is performed on the main data that is selected before the execution thereof. Referring to FIG. 12, this process is different from the access screen generating process shown in FIG. 6 in that step S31A has been added between steps S31 and S32, and step S35 has been changed to step S35A. The other processes are similar to those shown in FIG. 6, and thus, the description thereof will not be repeated here.

In step S31A, presentation users' icons are generated. Each presentation user's icon includes the identification information of a presentation user extracted in step S51 in FIG. 11. The same number of presentation users' icons as that of the identification information of the presentation users extracted in step S51 are generated. In step S35A, the selective access screen shown in FIG. 10 is generated, and the process returns to the presentation screen outputting process. The selective access screen is a screen obtained by adding to the access screen of the first embodiment an area for selectably displaying the icons generated in step S31A and the third command to transmit a switching instruction to MFP 100 in response to designation of one of the icons.

In the presentation screen outputting process shown in FIG. 11, it has been configured such that a piece of data, among the one or more pieces of data stored in presentation box 91, that has been stored earliest in the presentation box is selected in step S52, and that the presentation user whose identification information is associated with the selected data is selected as a first presenter in step S53. In place of or in addition to this, it may be configured such that the data firstly accessed or the data firstly output to the projector among the one or more pieces of data stored in presentation box 91 is selected and set as the main data, and that the presentation user whose identification information is associated with the selected data is selected as a first presenter.

MFP 100 according to the second embodiment selects, as a presenter, a presentation user from among one or more presentation users who are associated respectively with one or more pieces of data stored in presentation box 91, and selects, as main data, one of the one or more pieces of data stored in presentation box 91 that is associated with the presentation user selected as the presenter. When a presenter stores data in presentation box 91, main data is selected. This eliminates the need for the presenter to perform a main data selecting operation.

Further, MFP 100 of the second embodiment selects, as the presenter, the presentation user who is associated with the piece of data that was stored earliest among the one or more pieces of data stored in presentation box 91, and selects, as the main data, the one of the one or more pieces of data stored in presentation box 91 that is associated with the presentation user selected as the presenter. This eliminates the need to perform an operation of selecting a first presenter. Moreover, when a presenter stores data in presentation box 91, main data is selected. This eliminates the need for the presenter to perform the main data selecting operation.

Further, MFP 100 of the second embodiment selects, as the presenter, the presentation user who is associated with the piece of data that was firstly accessed among the one or more pieces of data stored in presentation box 91, and selects, as the main data, the one of the one or more pieces of data stored in presentation box 91 that is associated with the presentation user selected as the presenter. This eliminates the need to perform an operation of selecting a first presenter. Moreover, when a presenter stores data in presentation box 91, main data is selected. This eliminates the need for the presenter to perform the main data selecting operation.

Further, selective access screen 311 includes icons 316 to 319 which include identification information of the one or more presentation users who are associated respectively with the one or more pieces of data stored in presentation box 91. When one of icons 316 to 319 is selected, the presenter is switched from the presentation user who has been selected as the presenter to the presentation user whose identification information is included in the selected icon. This facilitates the presenter switching operation. Furthermore, when the presenter is switched, of the one or more pieces of data stored in presentation box 91, the data that is associated with the identification information of the presentation user newly designated as the presenter is selected as the main data. This allows an image of the data that has been stored in advance by the presentation user who has been newly designated as the presenter to be displayed on projector 210 as well as on PCs 200A to 200D used by participant users.

Furthermore, when a presenter operates operation panel 129 of MFP 100 to cause an original to be read and stored in presentation box 91, an original image is selected as the main data. Therefore, the presenter is only necessary to perform an operation of causing the original to be read and stored in the presentation box in order to select the main data and to cause the original image to be displayed on PCs 200A to 200D used by the participant users.

While MFP 100 has been described as an example of the information processing apparatus in the above embodiments, the present invention may of course be understood as a screen transmitting method for causing MFP 100 to carry out the processes illustrated in FIGS. 5 to 7 or FIGS. 11 and 12, or as a screen transmitting program for causing CPU 111 controlling MFP 100 to carry out the screen transmitting method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus capable of communicating with one or more user apparatuses, the information processing apparatus comprising:
    a storing portion capable of storing data in a plurality of storage areas;
    an authentication portion to authenticate a first user using one of said one or more user apparatuses on the basis of identification information received from the one of said one or more user apparatuses;
    a selecting portion to select, as main data, a piece of data currently being used by a second user from among one or more pieces of data stored in a presentation area, the presentation area being a predetermined one of said plurality of storage areas;
    a screen generating portion to generate an access screen including an image of said selected main data;
    an access detecting portion to detect an access to said presentation area by said first user; and
    a screen transmitting portion, in response to the event that said access detecting portion detects an access to said presentation area by said first user, to transmit said generated access screen to the one of said one or more user apparatuses that is used by said first user while said piece of data is being used by said second user.

2. The information processing apparatus according to claim 1, further comprising a presentation user registration portion to register a predetermined user as a presentation user, wherein
    said second user is said registered presentation user.

3. The information processing apparatus according to claim 1, wherein said second user is an author of said main data.

4. The information processing apparatus according to claim 1, wherein in response to an acceptance of a prescribed operation performed by said second user on one of the one or more pieces of data stored in said presentation area, said selecting portion selects, as the main data, the data on which the prescribed operation has been performed.

5. The information processing apparatus according to claim 1, further comprising:
an operation portion for a user to input an operation;
an operation user authentication portion to authenticate the user on the basis of the operation input into said operation portion;
an original reading portion to read an original to output an image of the original; and
an original image storing portion to store the original image output from said original reading portion into said presentation area, on the basis of the operation that the operation user authenticated by said operation user authentication portion inputs into said operation portion; wherein
said second user is the user authenticated by said operation user authentication portion, and
in response to the event that said output original image is stored in said presentation area, said selecting portion selects said stored original image as the main data.

6. The information processing apparatus according to claim 1, wherein said storing portion stores one or more presentation users in association with said one or more pieces of stored data, respectively,
the information processing apparatus further comprising a presenter selecting portion to select, as a presenter, one from among the one or more presentation users associated respectively with said one or more pieces of stored data, wherein
said selecting portion selects one of said one or more pieces of stored data that is associated with said presentation user selected as the presenter, and
said second user is the presenter selected by the presenter selecting portion.

7. The information processing apparatus according to claim 6, wherein said presenter selecting portion selects, as the presenter, the presentation user associated with one of said one or more pieces of stored data that was stored earliest in said storing portion.

8. The information processing apparatus according to claim 6, wherein said presenter selecting portion selects, as the presenter, the presentation user associated with one of said one or more pieces of stored data that was firstly accessed.

9. The information processing apparatus according to claim 6, wherein said presenter selecting portion includes a switching portion which switches the presenter from the presentation user who has been selected as the presenter to another one of said one or more presentation users.

10. The information processing apparatus according to claim 6, further comprising:
an operation accepting portion to accept an operation performed by a user;
an operation user authentication portion to authenticate the user on the basis of the operation accepted by said operation accepting portion;
an original reading portion to read an original to output an image of the original; and
an original image storing portion, on the basis of an operation input into said operation accepting portion by the user authenticated by said operation user authentication portion, to store the original image output from said original reading portion into said presentation area in association with said authenticated user; wherein
in response to the event that said original image is stored in said presentation area, said presenter selecting portion selects, as the presenter, the user authenticated by said operation user authentication portion, and
said second user is the user authenticated by said operation user authentication portion.

11. The information processing apparatus according to claim 1, wherein said screen generating portion generates the access screen which further displays, in a selectable manner, identification information of sub data other than said main data among said one or more pieces of stored data.

12. The information processing apparatus according to claim 11, wherein
said screen generating portion includes an auxiliary screen generating portion which generates an auxiliary screen in the case where a first selecting instruction to select the identification information of said sub data included in said access screen is received from a transmit apparatus among said one or more user apparatuses to which said access screen has been transmitted by said screen transmitting portion, the auxiliary screen including an image of the sub data specified by said selected identification information and selectably displaying the identification information of the main data and the identification information of the sub data that has not been selected, and
said screen transmitting portion transmits said generated auxiliary screen to said transmit apparatus that has issued said first selecting instruction.

13. The information processing apparatus according to claim 12, wherein
in the case where a second selecting instruction to select the identification information of the main data included in said auxiliary screen is received from said transmit apparatus to which said auxiliary screen has been transmitted by said screen transmitting portion, said screen generating portion generates said access screen, and
said screen transmitting portion transmits said generated access screen to said transmit apparatus that has issued said second selecting instruction.

14. The information processing apparatus according to claim 1, further comprising an outputting portion to externally output an image of a selected one of a plurality of pages included in the main data, wherein
said screen generating portion generates the access screen including the image of said selected page externally output from said outputting portion.

15. The information processing apparatus according to claim 14, wherein
said screen generating portion includes a moving image generating portion which generates a moving image on the basis of the image of said selected page, and
said screen generating portion generates the access screen including said generated moving image.

16. A screen transmitting method performed by an information processing apparatus capable of communicating with one or more user apparatuses,
said information processing apparatus including a storing portion capable of storing data in a plurality of storage areas, the screen transmitting method comprising steps of:

authenticating a first user using one of said one or more user apparatuses on the basis of identification information received from the one of said one or more user apparatuses;

selecting, as main data, a piece of data currently being used by a second user from among one or more pieces of data stored in a presentation area, the presentation area being a predetermined one of said plurality of storage areas;

generating an access screen including an image of said selected main data;

detecting an access to said presentation area by said first user; and in response to the event that an access to said presentation area by said first user is detected in said access detecting step, transmitting said generated access screen to the one of said one or more user apparatuses that is used by said first user while said piece of data is being used by the second user.

17. A non-transitory computer-readable recording medium encoded with a screen transmitting program, the screen transmitting program being executed by a computer which controls an information processing apparatus capable of communicating with one or more user apparatuses, said information processing apparatus including a storing portion capable of storing data in a plurality of storage areas, the screen transmitting program causing said computer to execute processing comprising steps of:

authenticating a first user using one of said one or more user apparatuses on the basis of one or more pieces of identification information received from the one of said one or more user apparatuses;

selecting, as main data, a piece of data currently being used by a second user from among one or more pieces of data stored in a presentation area, the presentation area being a predetermined one of said plurality of storage areas;

generating an access screen including an image of said selected main data;

detecting an access to said presentation area by said first user; and in response to the event that an access to said presentation area by said first user is detected in said access detecting step, transmitting said generated access screen to the one of said one or more user apparatuses that is used by said first user while said piece of data is being used by the second user.

\* \* \* \* \*